United States Patent
Guo et al.

(10) Patent No.: US 11,790,181 B2
(45) Date of Patent: Oct. 17, 2023

(54) EXTRACTIVE STRUCTURED PREDICTION IN INTERACTIVE SYSTEMS

(71) Applicant: International Business Machines Corporation, Armonk, NY (US)

(72) Inventors: Xiaoxiao Guo, Mountain View, CA (US); Mo Yu, White Plains, NY (US); Yupeng Gao, Elmsford, NY (US); Chuang Gan, Cambridge, MA (US); Shiyu Chang, Elmsford, NY (US); Murray Scott Campbell, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 16/997,494

(22) Filed: Aug. 19, 2020

(65) Prior Publication Data

US 2022/0058345 A1    Feb. 24, 2022

(51) Int. Cl.
| | |
|---|---|
| *G06F 40/35* | (2020.01) |
| *G06N 3/08* | (2023.01) |
| *G06F 40/295* | (2020.01) |
| *G06F 40/253* | (2020.01) |
| *G06F 40/284* | (2020.01) |

(52) U.S. Cl.
CPC ............ *G06F 40/35* (2020.01); *G06F 40/253* (2020.01); *G06F 40/284* (2020.01); *G06F 40/295* (2020.01); *G06N 3/08* (2013.01)

(58) Field of Classification Search
CPC ...... G06F 40/35; G06F 40/253; G06F 40/284; G06F 40/295; G06N 3/08
See application file for complete search history.

(56) References Cited

U.S. PATENT DOCUMENTS

| | | |
|---|---|---|
| 10,515,155 B2 | 12/2019 | Bacrach et al. |
| 10,546,066 B2 | 1/2020 | Li et al. |
| 10,546,584 B2 | 1/2020 | Bilgory et al. |

(Continued)

OTHER PUBLICATIONS

Williams, Jason, Kavosh Asadi and Geoffrey Zweig, "Hybrid Code Networks: practical and efficient end-to-end dialog control with supervised and reinforcement learning", 2017, Proceedings of the 55th Annual Meeting of the Association for Computational Linguistics. (Year: 2017).*

(Continued)

*Primary Examiner* — Daniel C Washburn
*Assistant Examiner* — James Boggs
(74) *Attorney, Agent, or Firm* — Scully, Scott, Murphy & Presser, P.C.; Caleb Wilkes (57) ABSTRACT

A current observation expressed in natural language is received. Entities in the current observation are extracted. A relevant historical observation is retrieved, which has at least one of the entities in common with the current observation. The current observation and the relevant historical observation are combined as observations. The observations and a template list specifying a list of verb phrases to be filled-in with at least some of the entities are input to a neural network, which can output the template list of the verb phrases filled-in with said at least some of the entities. The neural network can include attention mechanism. A reward associated with the neural network's output can be received and fed back to the neural network for retraining the neural network.

20 Claims, 6 Drawing Sheets

(56) References Cited

U.S. PATENT DOCUMENTS

| | | |
|---|---|---|
| 10,572,517 B2 | 2/2020 | Canim et al. |
| 11,068,474 B2* | 7/2021 | Ni .................... G06F 16/2425 |
| 2021/0065705 A1* | 3/2021 | Ham .................. G10L 15/1815 |

OTHER PUBLICATIONS

Wu, Chien-Sheng, Andrea Madotto, Genta Indra Winata and Pascale Fung, "End-to-End Dynamic Query Memory Network for Entity-Value Independent Task-Oriented Dialog", 2018, 2018 IEEE International Conference on Acoustics, Speech and Signal Processing (ICASSP), pp. 6154-6158. (Year: 2018).*

Hausknecht, Matthew J., Prithviraj Ammanabrolu, Marc-Alexandre Côté and Xingdi Yuan, "Interactive Fiction Games: A Colossal Adventure", Feb. 25, 2020, The Thirty-Fourth AAAI Conference on Artificial Intelligence (AAAI-20), pp. 7903-7910. (Year: 2020).*

Vlasov, Vladimir, Akela Drissner-Schmid and Alan Nichol, "Few-Shot Generalization Across Dialogue Tasks", 2018, ArXiv abs/1811.11707, pp. 1-10. (Year: 2018).*

Gao, Jianfeng, Michel Galley and Lihong Li, "Neural Approaches to Conversational AI", 2018, Proceedings of the 56th Annual Meeting of the Association for Computational Linguistics-Tutorial Abstracts, pp. 2-7. (Year: 2018).*

Liu, Huiting, Tao Lin, Hanfei Sun, Weijian Lin, Chih Wei Chang, Teng Zhong and Alexander I. Rudnicky, "RubyStar: A Non-Task-Oriented Mixture Model Dialog System", 2017, ArXiv abs/1711.02781, pp. 1-10. (Year: 2017).*

Ammanabrolu, Prithviraj, Wesley Cheung, Dan Tu, William Broniec and Mark O. Riedl, "Bringing Stories Alive: Generating Interactive Fiction Worlds", Jan. 28, 2020, ArXiv abs/2001.10161. (Year: 2020).*

Narasimhan, Karthik, Tejas D. Kulkarni and Regina Barzilay. "Language Understanding for Text-based Games using Deep Reinforcement Learning", 2015, Proceedings of the 2015 Conference on Empirical Methods in Natural Language Processing, Association for Computational Linguistics, pp. 1-11. (Year: 2015).*

Seo, Minjoon, Aniruddha Kembhavi, Ali Farhadi, and Hannaneh Hajishirzi, "Bi-Directional Attention Flow for Machine Comprehension", 2018, ArXiv abs/1611.01603, pp. 1-13. (Year: 2018).*

Clark, Christopher, and Matt Gardner, "Simple and Effective Multi-Paragraph Reading Comprehension", Jul. 2018, Proceedings of the 56th Annual Meeting of the Association for Computational Linguistics (vol. 1: Long Papers), pp. 845-855. (Year: 2018).*

Guo, Xiaoxiao, Mo Yu, Yupeng Gao, Chuang Gan, Murray Campbell, and Shiyu Chang, "Interactive Fiction Game Playing as Multi-Paragraph Reading Comprehension with Reinforcement Learning", Nov. 2020, Proceedings of the 2020 Conference on Empirical Methods in Natural Language Processing, pp. 7755-7765. (Year: 2020).*

Gatt, A., et al., "Survey of the State of the Art in Natural Language Generation: Core Tasks, Applications and Evaluation", arXiv:1703.09902v4, Jan. 29, 2018, pp. 1-118, appears in Journal of Artificial Intelligence Research (JAIR), pp. 65-170, vol. 61.

Usek, O., "Novel Methods for Natural Language Generation in Spoken Dialogue Systems", Doctoral Thesis, Charles University, Prague, Apr. 2017.

Anonymous, "Natural Language Semantics in Support of Knowledge Base Searching and Computer Aided Troubleshooting", IP.com No. IPCOM000246121DIP.com, May 10, 2016, 7 pages.

Anonymous, "Adapting Conversation Based on Perceived User Expertise", IP.com No. IPCOM000258019DIP.com, Apr. 1, 2019, 5 pages.

Anonymous, "Language Transposer for Cognitive Assistants", IP.com No. IPCOM000259227DIP.com, Jul. 22, 2019, 3 pages.

Narasimhan, "Language understanding for text-based games using deep reinforcement learning", arXiv:1506.08941v2, Sep. 11, 2015, 11 pages.

Hausknecht, M., et al., "Interactive fiction games: A colossal adventure", arXiv:1909.05398v3, Feb. 25, 2020, 20 pages.

Ammanabrolu, P., et al., "Graph constrained reinforcement learning for natural language action spaces", Published as a conference paper at ICLR 2020, arXiv:2001.08837v1, Jan. 23, 2020, 24 pages.

He, J., et al., "Deep reinforcement learning with a natural language action space", arXiv:1511.04636v5, Jun. 8, 2016, 15 pages.

Ammanabrolu, P., et al., "Playing text-adventure games with graph-based deep reinforcement learning", arXiv:1812.01628v2, Mar. 25, 2019, 9 pages.

Seo, M., et al., "Bidirectional attention flow for machine comprehension", Published as a conference paper at ICLR 2017, arXiv:1611.01603v6, Jun. 21, 2018, 13 pages.

Wang, S., et al., "Machine comprehension using match-lstm and answer pointer", Under review as a conference paper at ICLR 2017, arXiv:1608.07905v2, Nov. 7, 2016, 11 pages.

Wei-Yu, A., et al., "Qanet: Combining local convolution with global self-attention for reading comprehension", Published as a conference paper at ICLR 2018, arXiv:1804.09541v1, Apr. 23, 2018, 16 pages.

* cited by examiner

EXTRACTIVE STRUCTURED PREDICTION IN INTERACTIVE SYSTEMS

BACKGROUND

The present application relates generally to computers and computer applications, and more particularly to natural language processing, machine learning, neural networks, and natural language prediction and generation.

Natural Language Generation (NLG) allows for machine translation, news summarization, sentence simplification, styled paraphrasing, interactive systems, among others. Interactive systems include, for example, a goal-oriented dialog system and interactive fictions. Common approaches to natural language generation may be heuristic-based, for example, rule-based approaches using predefined text; planning-based, which include multi-stage planning through grammar; and learning-based, which may provide predictions.

An example of an interactive system is interactive fiction with template action set specifying actions, e.g., [climb OBJ], [pick up OBJ], [examine OBJ with OBJ]. Another example of an interactive system is a goal-oriented dialog system. Challenges in implementing an automated NLG technique in interactive systems is that there can be a large combinatorial number of responses, which are candidates for responses. Processing such a huge combinatorial number of responses can require a large amount of computation for a processor and slow the response time. Another challenge is partial observability of last observation context at the M iteration of interaction, which can affect the accuracy of the response.

BRIEF SUMMARY

A computer-implement method and system for natural language generation can be provided. The method, in an aspect, can include receiving a current observation expressed in natural language. The method can also include extracting entities in the current observation. The method can also include selecting a relevant historical observation from historical observations, the relevant historical observation selected based on the relevant historical observation having at least one of the entities in common with the current observation. The method can also include combining the current observation and the relevant historical observation as observations. The method can also include obtaining a template list, the template list specifying a list of verb phrases to be filled-in with at least some of the entities. The method can also include inputting the observations and the template list to a neural network, the neural network outputting the template list of the verb phrases filled-in with said at least some of the entities. The method can also include receiving a reward associated with the neural network's output. Based on the reward, the neural network automatically retrains itself.

In another aspect, the method for natural language generation can include receiving a current observation expressed in natural language. The method can also include extracting entities in the current observation. The method can also include selecting relevant historical observations from historical observations, the relevant historical observations selected based on the relevant historical observations having at least one of the entities in common with the current observation. The method can also include combining the current observation and the relevant historical observations as observations. The method can also include obtaining a template list, the template list specifying a list of verb phrases to be filled-in with at least some of the entities. The method can also include inputting the observations and the template list to a neural network, the neural network outputting the template list of the verb phrases filled-in with said at least some of the entities. The method can also include receiving a reward associated with the neural network's output. Based on the reward, the neural network automatically retrains itself. The relevant historical observations include a time series of historical observations.

Yet in another aspect, the method can include receiving a current observation expressed in natural language. The method can also include extracting entities in the current observation. The method can also include selecting a relevant historical observation from historical observations, the relevant historical observation selected based on the relevant historical observation having at least one of the entities in common with the current observation. The method can also include combining the current observation and the relevant historical observation as observations. The method can also include obtaining a template list, the template list specifying a list of verb phrases to be filled-in with at least some of the entities. The method can also include inputting the observations and the template list to a neural network, the neural network outputting the template list of the verb phrases filled-in with said at least some of the entities. The method can also include receiving a reward associated with the neural network's output. Based on the reward, the neural network automatically retrains itself. The neural network takes the verb phrases as queries and computes query-context representation using an attention mechanism in deep learning.

In another aspect, the method can include receiving a current observation expressed in natural language. The method can also include extracting entities in the current observation. The method can also include selecting a relevant historical observation from historical observations, the relevant historical observation selected based on the relevant historical observation having at least one of the entities in common with the current observation. The method can also include combining the current observation and the relevant historical observation as observations. The method can also include obtaining a template list, the template list specifying a list of verb phrases to be filled-in with at least some of the entities. The method can also include inputting the observations and the template list to a neural network, the neural network outputting the template list of the verb phrases filled-in with said at least some of the entities. The method can also include receiving a reward associated with the neural network's output. Based on the reward, the neural network automatically retrains itself. The entities include noun words identifiable in the observations.

In another aspect, the method can include receiving a current observation expressed in natural language. The method can also include extracting entities in the current observation. The method can also include selecting a relevant historical observation from historical observations, the relevant historical observation selected based on the relevant historical observation having at least one of the entities in common with the current observation. The method can also include combining the current observation and the relevant historical observation as observations. The method can also include obtaining a template list, the template list specifying a list of verb phrases to be filled-in with at least some of the entities. The method can also include inputting the observations and the template list to a neural network, the neural network outputting the template list of the verb phrases filled-in with said at least some of the entities. The method can also include receiving a reward associated with the neural network's output. Based on the reward, the neural network automatically retrains itself. The current observation includes a current dialog and the historical observations include past dialogs in a conversation carried on in an interactive system.

In another aspect, the method can include receiving a current observation expressed in natural language. The method can also include extracting entities in the current observation. The method can also include selecting a relevant historical observation from historical observations, the relevant historical observation selected based on the relevant historical observation having at least one of the entities in common with the current observation. The method can also include combining the current observation and the relevant historical observation as observations. The method can also include obtaining a template list, the template list specifying a list of verb phrases to be filled-in with at least some of the entities. The method can also include inputting the observations and the template list to a neural network, the neural network outputting the template list of the verb phrases filled-in with said at least some of the entities. The method can also include receiving a reward associated with the neural network's output. Based on the reward, the neural network automatically retrains itself. The current observation includes a game step in an interactive fiction game and the historical observations include previous games steps in the interactive fiction game.

In another aspect, the method can include receiving a current observation expressed in natural language. The method can also include extracting entities in the current observation. The method can also include selecting a relevant historical observation from historical observations, the relevant historical observation selected based on the relevant historical observation having at least one of the entities in common with the current observation. The method can also include combining the current observation and the relevant historical observation as observations. The method can also include obtaining a template list, the template list specifying a list of verb phrases to be filled-in with at least some of the entities. The method can also include inputting the observations and the template list to a neural network, the neural network outputting the template list of the verb phrases filled-in with said at least some of the entities. The method can also include receiving a reward associated with the neural network's output. Based on the reward, the neural network automatically retrains itself. The observations and the template list input to a neural network are tokenized using natural language processing, and embedded as vectors using word embeddings.

A system including a processor configured to perform the above described methods in one or more aspects can also be provided. A computer program product comprising a computer readable storage medium storing a program of instructions executable by a machine to perform one or more methods described herein may also be provided.

Further features as well as the structure and operation of various embodiments are described in detail below with reference to the accompanying drawings. In the drawings, like reference numbers indicate identical or functionally similar elements.

DETAILED DESCRIPTION

In one or more embodiments, systems and methods can be provided for natural language generation and/or natural language understanding (NLU) techniques, for instance, in interactive systems.

Interactive systems that are capable of understanding natural language and responding in the form of natural language text have potentials in various applications, such as interactive custom designers and education instructors. In an aspect, the system and/or method in embodiments may efficiently and accurately perform natural language understanding of a given text, which may be unrestricted, and generate an accurate response in natural language to the given text, for example, based on full observation of historical context of the given text.

By way of example, but not limited to, a system and/or method in one or more embodiments can be used in an application such as Interactive Fiction (IF), which operates on relatively unrestricted natural language text and requires responding (e.g., accurately) based on observing or analyzing such unrestricted natural language text. IF games are world-simulating software, in which players use text commands to control the protagonist and influence the simulated world. IF gameplay agents need to simultaneously understand the game's information from a text display (observation) and generate natural language command (action) via a text input interface. Without providing an explicit game strategy, the agents need to identify behaviors that maximize objective-encoded rewards. IF games can be composed of human-written texts distinct from previous text games with synthetic texts. For example, a characteristic of IF is that game designers elaborately craft on the literariness of the narrative texts to attract players when creating IF games. The resulting texts in IF games can be considered more linguistically diverse and sophisticated than the template-generated ones in synthetic text games. Another characteristic of IF is that the language contexts of IF games are more inclusive, because various designers contribute to large selections of domains and genres, such as adventure, fantasy, horror, and science fiction. The text commands to control characters can be considered less restricted, having sizes over six orders of magnitude larger than previous text games.

The complexity of interactive systems, which may include unrestricted and diverse text content can pose technical challenges in NLU techniques. One challenge can be the difficulty of exploration in the huge natural language action space, for instance different from synthetic text. While understanding natural language can integrate NLU techniques with reinforcement learning (RL), to make RL agents learn efficiently without prohibitive exhaustive trials, the action or response estimation should be able to generalize learned knowledge from tried actions to others.

Another challenge is partial observability. The text received to be interpreted and responded to may include only the current or latest information, which may not be sufficient for generating an accurate response. For example, referring to an IF game example, at each game-playing step, the agent receives a textual observation describing the locations, objects, and characters of the game world. But the latest observation is often not a sufficient summary of the interaction history and may not provide enough information to determine the long-term effects of actions or responses.

The system and/or method in one or more embodiments provide for understanding of natural language and generating accurate responses or actions in an efficient manner. The system and/or method in an embodiment may implement Multi-Passage Reading Comprehension (MPRC) and harness MPRC techniques to solve the huge action space and partial observability challenges.

Figure 1:
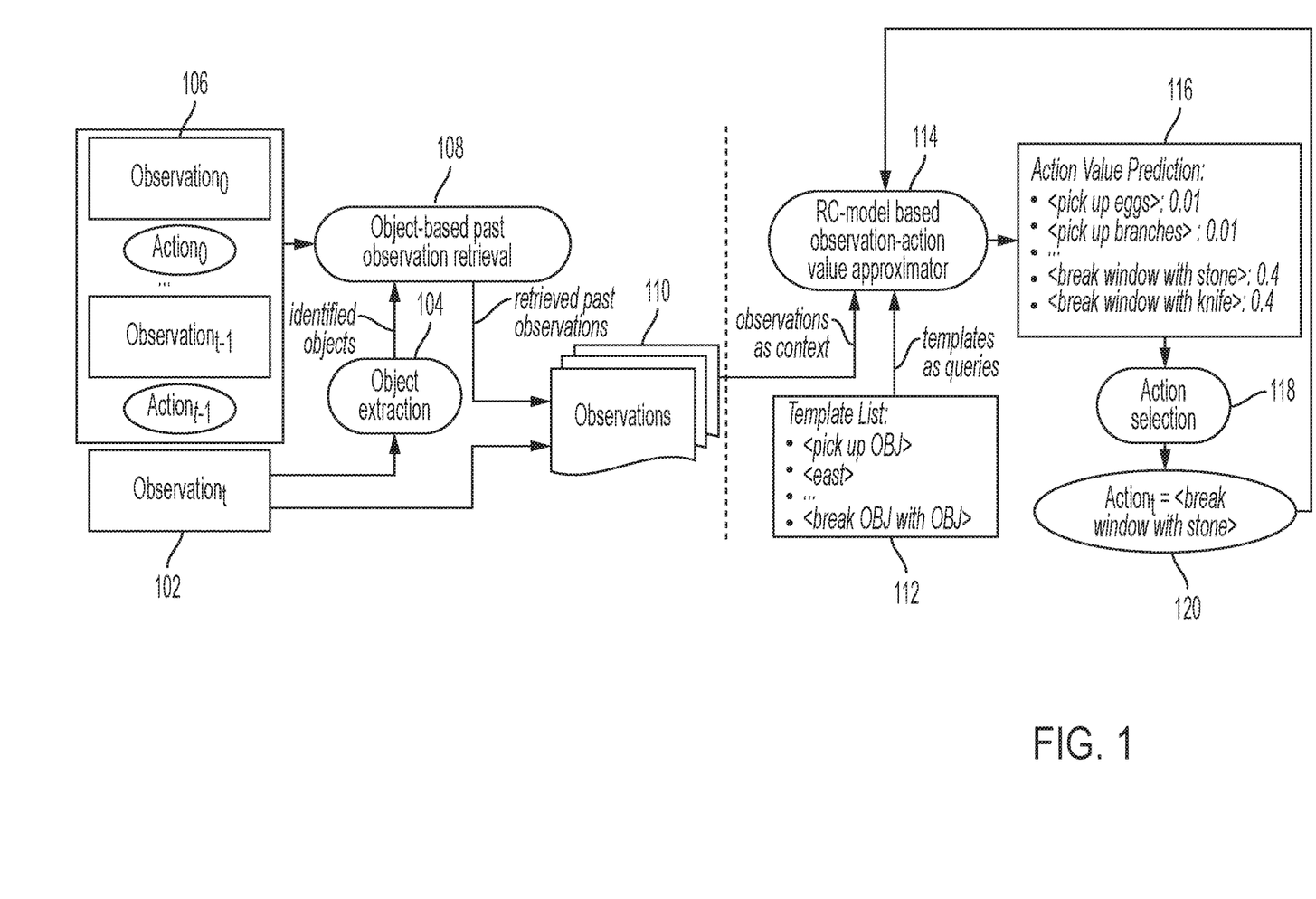
FIG. 1 is a diagram showing natural language generation using multi-paragraph reading comprehension (RC) tasks in an embodiment.

FIG. 1 is a diagram showing natural language generation using multi-paragraph reading comprehension (RC) tasks in an embodiment. An action value prediction (e.g., predicting the long-term rewards of taking an action) includes generating and scoring a compositional action structure by finding supporting evidence from an observation. In an aspect, each action is an instantiation of a template, e.g., verb phrase with a few placeholders of object arguments it takes, e.g., shown at 112. Then the action generation process can be viewed as extracting objects for a template's placeholders from the textual observation, based on the interaction between the template verb phrase and the relevant context of the objects in the observation. In aspect, the system and/or method addresses the structured prediction and interaction problems with the idea of context-question attention mechanism in RC models. For example, specifically, the system and/or method in an embodiment treat the observation as a passage and each template verb phrase as a question. The filling of object placeholders in the template thus becomes an extractive question-answer (QA) problem that selects objects from the observation given the template. Simultaneously, each action (e.g., a template with all placeholder replaced) gets its evaluation value predicted by the RC model. The system and/or method in an aspect can better capture the fine-grained interactions between observation texts and structural actions. Previous approaches, which represent the observation as a single vector have mostly ignored the fine-grained dependency among action elements.

In an aspect, the system and/or method can alleviate partial observability by enhancing the current observation with potentially relevant history and predicting actions over the enhanced observation. The system and/or method, in an embodiment retrieve potentially relevant historical observations with an object-centric approach, so that the retrieved ones are more likely to be connected to the current observation 102 as they describe at least a common object. The system and/or method then apply attention mechanisms, e.g., as part of a neural network model at 114, across the retrieved multiple observation texts to focus on informative contexts for action value prediction 116.

Given a question, reading comprehension (RC) aims to find the answer to the question based on a paragraph that may contain supporting evidence. Extractive QA (question answer) is an RC setting which extracts a span from the paragraph as answer. Multi-paragraph reading comprehension (MPRC) (e.g., reading comprehension over multiple paragraphs) deals with the more general task of answering a question from multiple related paragraphs, where each paragraph may not necessarily support the correct answer. A formulation of the system and/or method in an embodiment becomes an MPRC setting when the system and/or method enhance the state representation with historical observations and predict actions from multiple observation paragraphs. In MPRC, the system and/or method aim to select relevant paragraphs from all the input paragraphs for the reader to focus on.

Referring to FIG. 1, the components shown include computer-implemented components, for instance, implemented and/or run on one or more processors such as hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

An observation 102 is received. For example, a processor receives an observation 102. Examples of observations include, but are not limited to, a dialog in an interactive system, text or passage at a game step in an interactive fiction game, and/or others in which there are a series or sequence of passages and a response or action is generated for a passage in the series, for example, each passage in the series. Object extraction 104 extracts objects from the given observation 102 (e.g., the current observation). For example, the processor detects entities at 104 (e.g., objects such as "lantern") in the observation. Object-based past observation retrieval 108 retrieves potential relevant historical observations and associated responses. For example, the processor retrieves from a database or a data store that stores historical observations 106, those historical observations that have the entities extracted at 104 from the given observation 102. In an embodiment, the number or window of past historical observations to search from which to retrieve the relevant historical observations can be predefined. The current observation and the retrieved historical observations (e.g., concatenated observations) are shown at 110. Both the current observation and the retrieved historical observations can be input to a neural network model or a machine learning model as observations or observation text.

A machine learning model, for example, a neural network 114 is trained, based on observations and templates, to compute a template-aware observation representation and find a best fit response. For example, for each template (e.g., turn on), the neural network 114 computes a template-aware observation representation. The representation at the detected entity positions can be viewed as the response representation (e.g., turn on lantern). The neural network 114 projects the response representation to a scalar (e.g., in the last layer of the neural network) as an estimate of the utility of generating such response, which response can be learned via reinforcement learning (RL). Max-pooling can be performed over the entity positions and templates (i.e., channels) to obtain the greedy response.

The neural network 114, for example, takes as input the observations 110 and a template list 112. The template list 112 includes verb phrase template with placeholders for objects. The neural network 114 produces action value prediction 116, for example, generates a populated template, populated with entities corresponding to the verb in the template. Action selection 118 selects (e.g., a processor selects) an action or response 120 based on determining the action or response 118 with the maximal or highest score. Reward for the selected action 120 can be fed back to the neural network 114 as a feedback, based on which the neural network 114 retrains itself.

Table 1 shows a template list and possible entities or objects, which are candidates for placeholders.

TABLE 1

| template | object 1 list | object 2 list |
| --- | --- | --- |
| turn on_ | itemX | itemX |
| open_ | jewels | door |
| take_ | machine | case |
| take_from_ | lantern | troll |
| east | gothic | all |

The object lists in Table 1 are derived or extracted based on the following example observation, e.g., current text observation.

"You are in the living room. There is a doorway to the east, a wooden door with strange gothic lettering to the west, which appears to be nailed shut, a trophy case, and a large designY rug in the center of the room. Above the trophy case hangs an elvish itemX of great antiquity. A battery-powered brass lantern is on the trophy case."

In an embodiment, the neural network 114 can be a reading comprehension (RC) model based observation-action value approximator. Such a model can use observations as context and templates as queries. The neural network 114 outputs action value prediction, which includes filled-in templates with scores 116.

In an aspect, the system and/or method can handle and improve partial observability by retrieving past observations with shared entities and concatenating the past observations with the current observation. For instance, the left portion of FIG. 1 shows multi-passage retrieval for partial observability; the right portion of FIG. 1 shows multi-passage reading comprehension (RC) for action value learning. Extractive structured prediction computation is mild computation, $O(KTn)$, where T is the number of templates, K is the number of slots in the templates, n is the number of detected objects in the context and n<<N effectiveness. N represents the total number of objects. The system and/or method in one or more embodiments may only consider objects that appear in the context, i.e., a subset of the objects. In contrast, previous methods required $TN^K$ computation.

As described above, the system and/or method can improve a machine in understand natural language and generating natural language, e.g., generating natural language response to the comprehended natural language. Natural language understanding and generating responses based on the understanding can be applied in automated systems such as interactive systems, e.g., a dialog system (e.g., human-machine dialog), an interactive fiction (IF) game, and/or others.

Taking the IF game as an example, a problem can be formulated as follows. Each IF game can be defined as a Partially Observable Markov Decision Process (POMDP), namely a 7-tuple of (S, A, T, O, Ω, R, γ), representing the hidden game state set, the action set, the state transition function, the set of textual observations composed from vocabulary words, the textual observation function, the reward function, and the discount factor respectively. The game playing agent interacts with the game engine in multiple turns until the game is over or maximum number of steps is reached. At the t-th turn, the agent receives a textual observation describing the current game state $o_t \in O$ and sends a textual action command $a_t \in A$ back. The agent receives additional reward scalar $r_t$ which encodes the game designers' objective of game progress. Thus the task of the game playing can be formulated to generate a textual action command per step as to maximize the expected cumulative discounted rewards $E[\Sigma_{t=0}^{\infty} \gamma^t r_t]$. Value-based RL approaches learn to approximate a state-action value function $Q(o_t, a_t; \theta)$ which measures the expected cumulative rewards of taking action $a_t$ when observing $o_t$. The agent selects action based on the action value prediction of $Q(o, a; \theta)$.

Template Action Space

Template action space considers actions satisfying decomposition in the form of <verb, $arg_0$, $arg_1$>. "verb" is an interchangeable verb phrase template with placeholders for objects and "$arg_0$" and "$arg_1$" are optional objects. For example, the action command [east], [pick up eggs] and [break window with stone] can be represented as template actions <east, none, none>, <pick up OBJ, eggs, none> and <break OBJ with OBJ, window, stone>. In an embodiment, a predefined template library and object list can be used. For example, in IF games, such template library and object list are extracted from human game play records. The verb phrases usually include one or more vocabulary words and each object is usually a single word.

Figure 2:
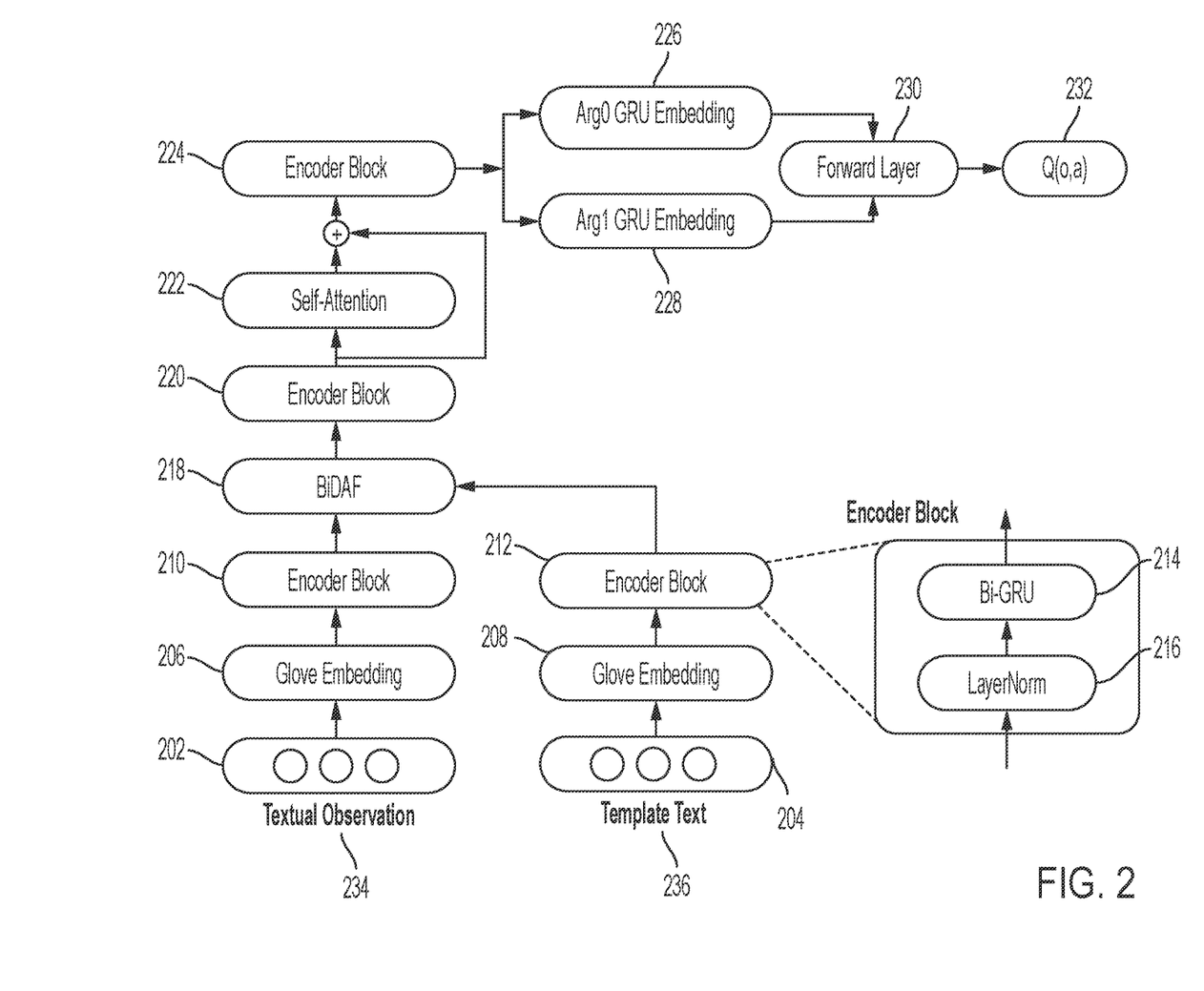
FIG. 2 is a diagram illustrating example model architecture of a RC-based action prediction model in an embodiment.

The system and/or method tokenize the observation 234 and the verb phrase 236 into words shown at 202, 204, then embed these words into word vector representation, for example, using embeddings 206, 208 such as pre-trained GloVe embeddings. GloVe (Global Vectors for Word Representation) is an algorithm that generates word embeddings by aggregating global word-word co-occurrence matrix from a corpus. The resulting embeddings show interesting linear substructures of the word in vector space. A shared encoder block shown at 210, 212 that includes layer normalization (e.g., Layer-Norm) 214 and a neural network (e.g., Bidirectional gated recurrent unit (GRU)) 216, processes the observation and verb word embeddings to obtain the separate observation and verb representation. For example, the encoder blocks 210, 212 have trainable parameters, which the encoder blocks 210, 212 share. Briefly, layer normalization normalizes internal layer features of a neural network, and it stabilizes the neural network training and substantially reduces the training time.

RC Model for Template Actions

In an embodiment, the system and/or method parameterizes the observation-action value function $Q(o, a=<verb, arg_0, arg_1>; \theta)$ by utilizing the decomposition of the template actions and context-query contextualized representation in RC. A model in the system and/or method in an embodiment treat the observation o as a context in RC and the verb=$(v_1, v_2, \ldots v_k)$ component of the template actions as a query. Then a verb-aware observation representation is derived via a RC reader model with Bidirectional Attention Flow (BiDAF) and self-attention, which provides for answering a query about a given paragraph. The observation representation responding to the $arg_0$ and $arg_1$ words are pooled and projected to a scalar value estimate for Q(o, a=<verb, $arg_0$, $arg_1$>; θ).

FIG. 2 is a diagram illustrating example model architecture of a RC-based action prediction model in an embodiment. For example, the model shown in FIG. 2 is an example of the neural network shown in FIG. 1. In an embodiment, the template text 236 is a verb phrase with placeholders for objects, such as [pick up OBJ] and [break OBJ with OBJ].

Observation and Verb Representation

The system and/or method tokenize the observation 234 and the verb phrase 236 into words shown at 202, 204, then embed these words into word vector representation, for example, using embeddings 206, 208 such as pre-trained GloVe embeddings. GloVe (Global Vectors for Word Representation) is an algorithm that generates word embeddings by aggregating global word-word co-occurrence matrix from a corpus. The resulting embeddings show interesting linear substructures of the word in vector space. A shared encoder block shown at 210, 212 that includes layer normalization (e.g., Layer-Norm) 216 and a neural network (e.g., Bidirectional gated recurrent unit (GRU)) 214, processes the observation and verb word embeddings to obtain the separate observation and verb representation. For example, the encoder blocks 210, 212 have trainable parameters, which the encoder blocks 210, 212 share. Briefly, layer normalization normalizes internal layer features of a neural network, and it stabilizes the neural network training and substantially reduces the training time.

Observation-Verb Interaction Layers

Given the separate observation and verb representation, the system and/or method in an embodiment apply two attention mechanisms (e.g., shown at 218 and 222) to compute a verb-contextualized observation representation. The system and/or method in an embodiment first apply BiDAF shown at 218 with observation as the context input and verb as the query input. For example, specifically, the system and/or method denote the processed embeddings for observation word i and template word j as $o_i$ and $t_j$. The attention between the two words is then $a_{ij}=w_1 \cdot o_i + w_2 \cdot t_j + w_3 \cdot (o_i \otimes t_j)$, where $w_1$, $w_2$, $w_3$ are learnable vectors and $\otimes$ is element-wise product. The system and/or method then compute the "verb2observation" attention vector for the i-th observation word as $c_i = \Sigma_j p_{ij} t_j$ with $p_{ij} = \exp(a_{ij})/\Sigma_j \exp(a_{ij})$. Similarly, the system and/or method in an embodiment compute the "observation2verb" attention vector as $q = \Sigma_i p_i o_i$ with $p_i = \exp(\max_j a_{ij})/\Sigma_i \exp(\max_j a_{ij})$. The system and/or method concatenate and project the output vectors as $w_4 \cdot [o_i, c_i, o_i \otimes c_i, q \otimes c_i]$, followed by a linear layer with leaky rectified linear unit (ReLU) activation units. The output vectors are processed by an encoder block at 220. The system and/or method then apply a residual self-attention at 222 on the outputs of the encoder block. In an embodiment, the self-attention is the same as BiDAF, but only between the observation and itself. An encoder block at 224 further processes the output from self-attention 222 to derive contextualized representation of words. The encoder block at 220 and 224 may have separate trainable parameters. In an embodiment, the encoder blocks at 220 and 224 do not share parameters with encoder block at 210 or 212. By way of example, the encoder block at 224 may encode relevant context of a given word in the vector that represents the word. In one or more embodiments, the function of the encoder blocks is to derive contextualized representation. For different contexts, separate encoder blocks may be used.

By way of example, encoder blocks at 210 and 212 have shared parameters because their inputs are all from word embeddings, e.g., GloVe.

Observation-Action Value Prediction

The system and/or method in an embodiment generate an action by replacing the placeholders ($arg_0$ and $arg_1$) in a template with objects appearing in the observation. In an embodiment, the observation-action value Q(o, a=(verb, $arg_0=obj_m$, $arg_1=obj_n$)); θ) is achieved by processing each object's corresponding verb-aware observation representation. For example, specifically, the system and/or method get the indices of an obj in the observation texts I(obj, o). When the object is a noun phrase, the system and/or method take the index of its headword. In an embodiment, some templates may take zero or one object. In an embodiment, the system and/or method may denote the unrequired objects as none so that all templates take two objects. In an embodiment, the index of the none object is for a special token. The system and/or method in an embodiment set to the index of split token of the observation contents. Because the same object can have different meanings when it replaces different placeholders, the system and/or method apply a plurality, e.g., two GRU-based embedding functions 226, 228 for the two placeholders, to get the object's verb-placeholder dependent embeddings. The system and/or method in an embodiment derive a single vector representation $h_{arg_0=obj_m}$ for the case that the placeholder $arg_0$ is replaced by $obj_m$ by mean-pooling over the verb-placeholder dependent embeddings indexed by $I(obj_m, o)$ for the corresponding placeholder $arg_0$. The system and/or method in an embodiment apply a linear/affine transformation, e.g., at 230, on the concatenated embeddings of the two placeholders to obtain the observation action value Q(o, a)=$w_S \cdot [h_{arg_0=obj_m}, h_{arg_1=obj_n}]$ for=(verb, $arg_0=obj_m$, $arg_1=obj_n$), e.g., shown at 232. In an aspect, the system and/or method's formulation avoids the repeated computation overhead among different actions with a shared template verb phrase.

Multi-Paragraph Confidence Method for Partial Observations

The observation at the current step or current dialog (or the like) sometimes does not have full-textual evidence to support action selection and value estimation, due to the inherent partial observability (e.g., of IF games or dialogs). For example, taking an IF game as an example, when repeatedly attacking a troll with an itemX, the player needs to know the effect or feedback of the last attack to determine if an extra attack is necessary. It can thus be important for an agent to efficiently utilize historical observations to better support action value prediction. In the system and/or method's RC-based action prediction model, the historical observation utilization can be formulated as selecting evidential observation paragraphs in history, and predicting the action values from multiple selected observations, namely a Multiple-Paragraph Reading Comprehension (MPRC) problem. The system and/or method in an embodiment retrieve past observations with an object-centric approach.

Past Observation Retrieval

Multiple past observations may share objects with the current observation, and it can be computationally expensive and unnecessary to retrieve all of such observations. The utility of past observations associated with each object is often time-sensitive in that new observations may entirely or partially invalidate old observations. The system and/or method in an embodiment may implement a time-sensitive strategy for retrieving past observations. For example, specifically, given the detected objects from the current observation, the system and/or method retrieve the most recent K observations with at least one shared object. The K retrieved observations are sorted by time steps and concatenated to the current observation. The observations from different time steps (or e.g., different dialogs in an interactive dialog system) are separated by a special token. The system and/or method's RC-based action prediction model in an embodiment treat the concatenated observations as the observation inputs, and no other parts are changed. The notation $o_t$ may be used to represent the current observation and the extended current observation interchangeably.

Different embodiments of RC-model are possible. For example, an RC-model may be implemented without the self-attention component. As another example, an RC-model may be implemented without the argument-specific embedding. Yet as another example, an RC-model may be implemented with Transformer-based block encoder.

Training Loss

The system and/or method in an embodiment may apply a deep learning, e.g., the Deep Q-Network (DQN) to update the parameters θ of the RC-based action prediction model. In embodiment, the loss function is: $\mathcal{L}(\theta) = \mathbf{E}_{(o_t, a_t, r_t, o_{t+1}) \sim \rho(\mathcal{D})} [\|Q(o_t, a_t; \theta) - (r_t + \gamma \max_b Q(o_{t+1}, b; \theta^-))\|]$ where $\mathcal{D}$ is the experience replay including recent gameplay transition (or dialog transition or the like) records and ρ is a distribution over the transitions defined by a sampling strategy.

Prioritized Trajectories

The distribution ρ can have an impact on DQN performance. Some transitions with zero immediate rewards or even negative rewards can also have an impact in recovering well-performed trajectories. In an embodiment, a strategy can be extended from transition level to trajectory level. In an embodiment, transitions from trajectories can be prioritized that outperform the exponential moving average score of recent trajectories.

By way of example, the system and/or method can be implemented, for example, using natural language processing techniques and machine learning such as neural network techniques. For example, a natural language processing functions or library of functions can be used to tokenize the observations and detect the objects in the observation. Embedding such as the 100-dimensional GloVe embeddings can be used as fixed word embeddings. The out-of-vocabulary words can be mapped to a randomly initialized embedding. In an example implementation, Bi-GRU hidden states can be set to 128. The history retrieval window K can be a predefined number, e.g., 2. For deep neural network such as DQN configuration, by way of example, the system and/or method in an embodiment can use the ε-greedy strategy for exploration, annealing ε from 1.0 to 0.05. By way of example, γ can be set to 0.08. The system and/or method can also use an adaptive learning rate optimization such as Adam to update the weights with $10^{-4}$ learning rate. Other parameters can be set to their default values. Other configuration settings and/or implementations are possible.

Previous known agents predict actions conditioned on a single vector representation of the whole observation texts, and do not exploit the fine-grained interplay among the template components and the observations. The system and/or method in one or more embodiments formulate action prediction as an RC task, better utilizing the rich textual observations with deeper language understanding. The system and/or method in one or more embodiments also provide for training sample efficiency. Collected interaction data may be stored and resampled in updating the models. For example, consider that the model is updated 100,000 times. Agents in the system and/or method in one or more embodiments may interact with the environment one step per update, for example, resulting in a total of 0.1 million environment interaction data. Compared to other known agent methods, the environment interaction data in the system and/or method can be significantly smaller.

Figure 3:
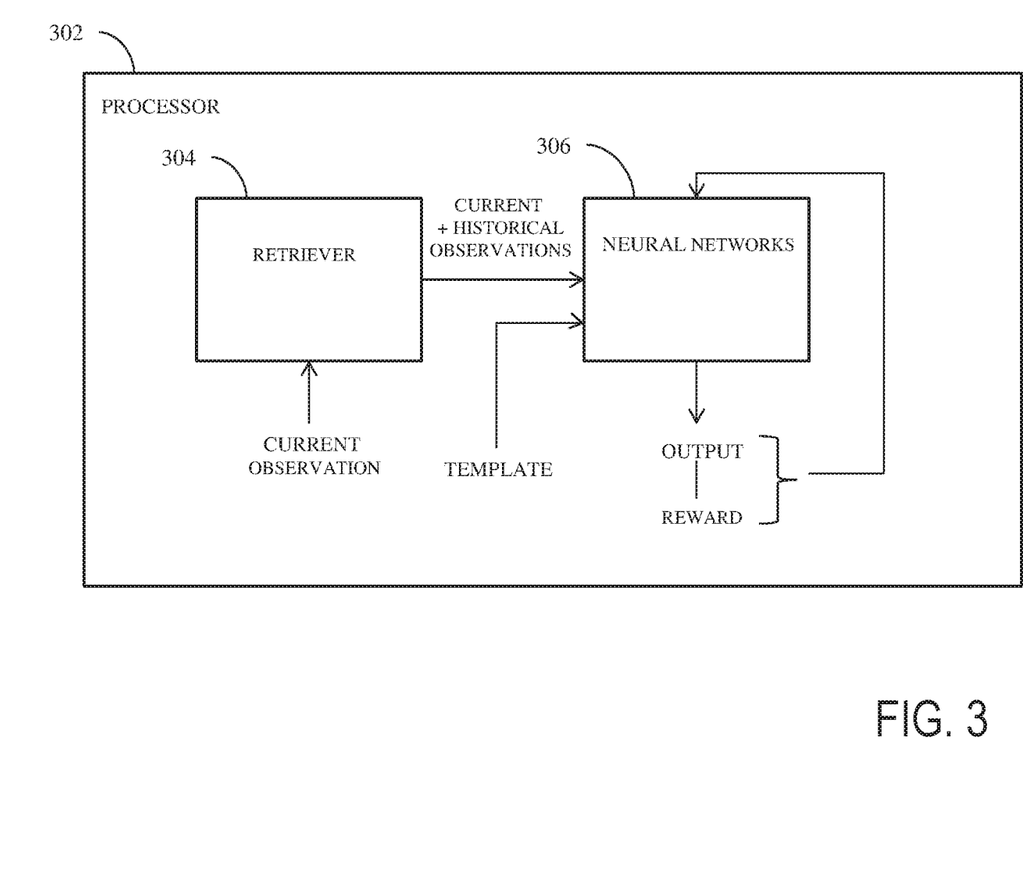
FIG. 3 shows a block diagram of a system in an embodiment.

While the above example description referred to an IF game interactions, the system and/or method apply to natural language generation and interactive systems in general. For example, the system and/or method can be implemented for a dialog system, such as a human-machine dialog interactions using natural language. The system and/or method can be for natural language generation for task or goal-oriented or directed interactive system. FIG. 3 shows a block diagram of a system in an embodiment. A processor 302 such as a hardware processor may include or run one or more components implementing the system. In an embodiment such a system can include an entity-centric past observation retriever 304 that retrieves relevant history observations to augment the current observation, for example, for partial observability mitigation. For example, the entity-centric past observation retriever 304 can identify one or more entities in a current observation and retrieve historical observations which also includes the identified one or more entities. The entity can be noun words or phrases that are identifiable in the observations. In an embodiment, the retriever 304 can gather past observations having common entities with current observation and sort the retrieved observations in time ordering. The retrieved historical observations and the current observation are treated as observations for inputting to a neural network with a template list. The template list in an embodiment includes verb phrases with unfilled entity placeholders.

An extractive structured prediction-based natural language generation module 306, which can include one or more neural networks, handles combinatorial action space, which can be relatively large. The system can be trained end-to-end via value-based reinforcement learning algorithm, e.g., Q-Learning. The extractive structured prediction-based natural language generation module 306 in an embodiment treats the observations as a context and computes the word spans of identified entities. For example, observations can be annotated with the word spans of identified entities. The extractive structured prediction-based natural language generation module 306 in an embodiment takes the verb phrases or response templates as queries and computes query-context representation via one or more attention mechanisms in deep learning. The extractive structured prediction-based natural language generation module 306 in an embodiment treats the natural language response generation as slot-filling by inserting the identified word spans into the verb phrases or response templates and estimates the effects of the generated response by projecting the pooled representation computed on the identified word spans into scalars (for example, shown at 226, 228 and 230 in FIG. 2). In an embodiment, a value-based reinforcement learning algorithm optimizes the extractive structured prediction-based natural language generation module 306 end-to-end by minimizing prediction errors output by the module 306, e.g., the estimated the effects of the generated response.

Figure 4:
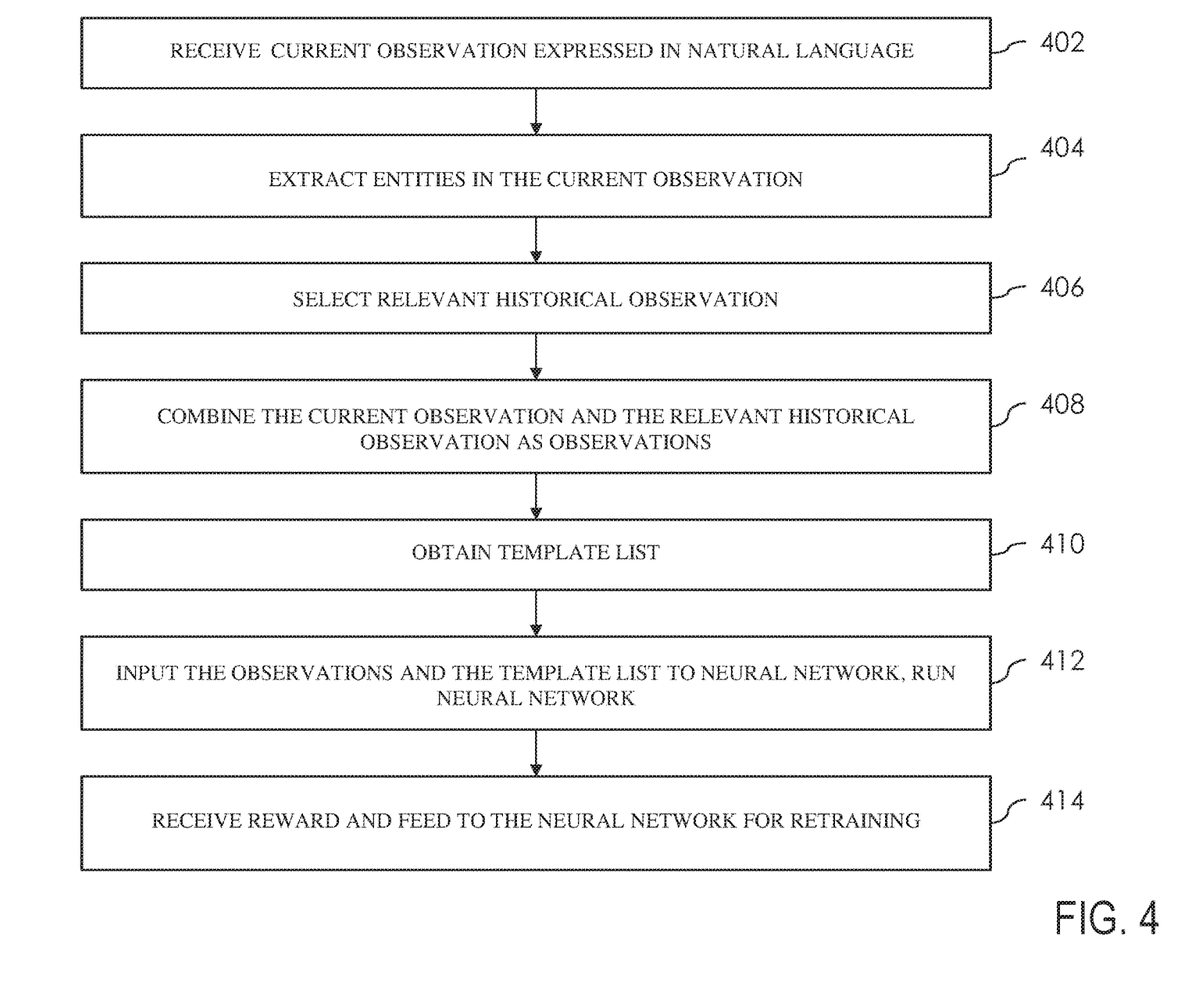
FIG. 4 is a flow diagram illustrating a method in an embodiment.

FIG. 4 is a flow diagram illustrating a method in an embodiment. The method can be a computer-implemented or computer-executable method, which can be run on or by one or more computer processors such as one or more hardware processors, including but not limited to general purposes processors, special purpose processors, accelerator processors such as graphics processing unit (GPU) and/or others. At 402, a current observation expressed in natural language is received. For example, the current observation can include a current dialog in a conversation carried on in an interactive system, for example, between an automated computer agent and a human, or for example, between automated computer agents. As another example, the current observation can include a game step in an interactive fiction game.

At 404, entities in the current observation are extracted. For example, the entities include noun words identifiable in the observations.

At 406, a relevant historical observation can be selected from historical observations. For example, the relevant historical observation is selected based on the relevant historical observation having at least one of the entities in common with the current observation. In an embodiment, the relevant historical observation can include a plurality of relevant historical observation in a time series. As an example, the historical observations can include past dialogs in a conversation carried on in an interactive system. As another example, the historical observations can include previous games steps in the interactive fiction game.

At 408, the current observation and the relevant historical observation can be combined or concatenated as observations.

At 410, a template list can be obtained. The template list includes or specifies a list of verb phrases to be filled-in with at least some of the entities. Such a template list can be predefined. For example, a list of verb phrases with placeholders to be filled-in with entities can be predefined.

At 412, the observations and the template list can be input to a language model, for example, a neural network. The language model or the neural network outputs the template list of the verb phrases filled-in with at least some of the entities in the current observation. The language model in filling-in the entities in the current observation considers the usage of the entities in context with the past or historical one or more observations.

At 414, a reward associated with the language model or neural network's output can be obtained and fed back to the language model or neural network. Based on the reward, the neural network automatically retrains itself. For example, the neural network can include reinforcement learning such as a DQN for performing multi-paragraph reading comprehension. In an embodiment, the neural network takes the verb phrases as queries and computes query-context representation using an attention mechanism in deep learning. In an embodiment, the observations and the template list input to a neural network are tokenized using natural language processing, and embedded as vectors using word embeddings.

Figure 5:
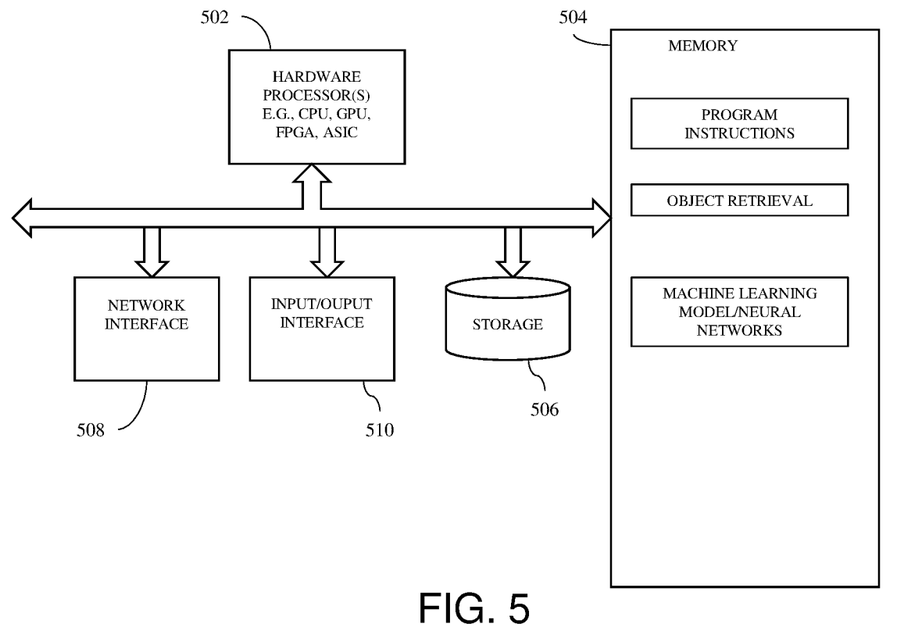
FIG. 5 is a diagram showing components of a system in an embodiment for natural language generation.

FIG. 5 is a diagram showing components of a system in one embodiment for natural language generation. One or more hardware processors 502 such as a central processing unit (CPU), a graphic process unit (GPU), and/or a Field Programmable Gate Array (FPGA), an application specific integrated circuit (ASIC), and/or another processor, may be coupled with a memory device 504, and perform past or historical observations retrieval and training of a neural network for language generation. A memory device 504 may include random access memory (RAM), read-only memory (ROM) or another memory device, and may store data and/or processor instructions for implementing various functionalities associated with the methods and/or systems described herein. One or more processors 502 may run computer instructions stored in memory 504 or received from another computer device or medium. A memory device 504 may, for example, store instructions and/or data for functioning of one or more hardware processors 502, and may include an operating system and other program of instructions and/or data. One or more hardware processors 502 may receive input including a current observation, extract entities and retrieve historical observations that have entities in common with the current observation. At least one hardware processor 502 may run a trained natural language generation model that performs extractive structured prediction for natural language generation, for example, in interactive systems, based on the observations and a template list of verb phrases. In one aspect, historical observations and/or template list of verb phrases input to the model may be stored in a storage device 506 or received via a network interface 508 from a remote device, and may be temporarily loaded into a memory device 504. The learned or trained prediction model may be stored on a memory device 504, for example, for running by one or more hardware processors 502. One or more hardware processors 502 may be coupled with interface devices such as a network interface 508 for communicating with remote systems, for example, via a network, and an input/output interface 510 for communicating with input and/or output devices such as a keyboard, mouse, display, and/or others.

Figure 6:
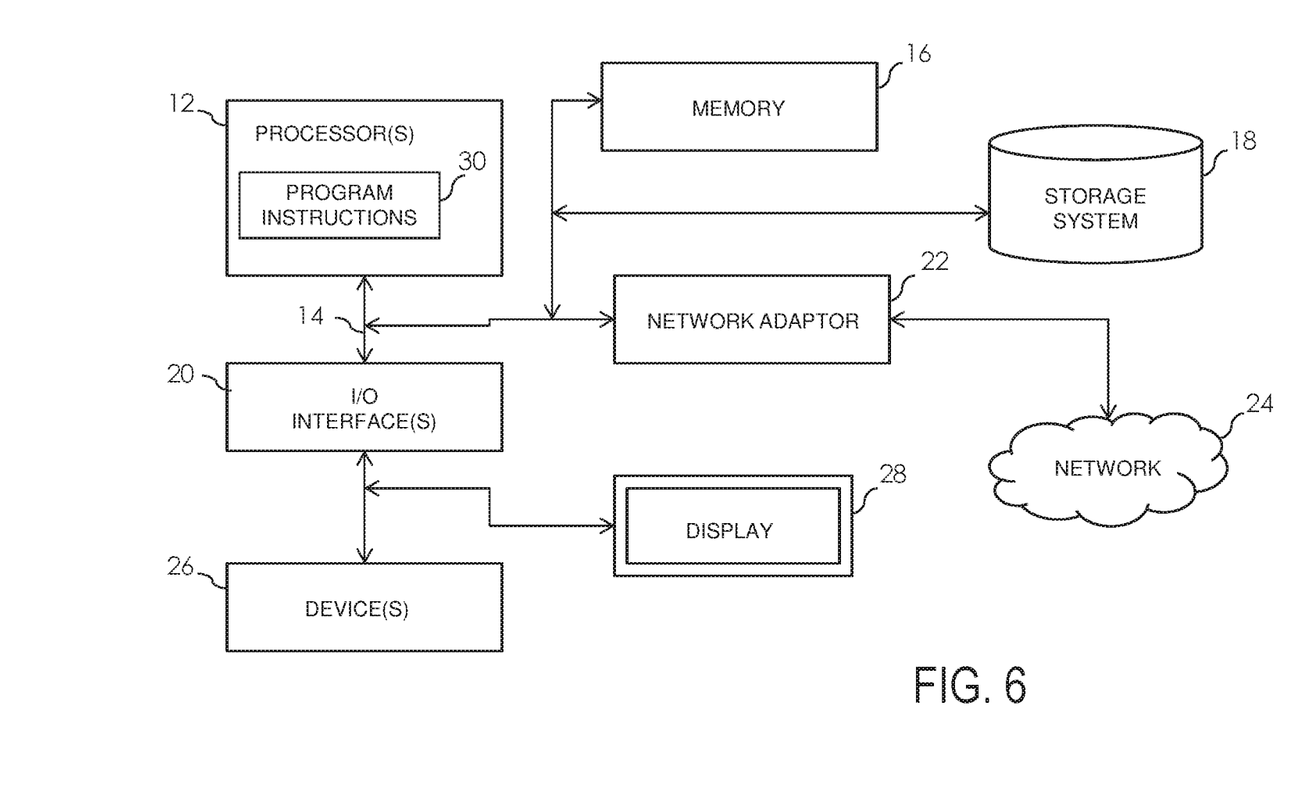
FIG. 6 illustrates a schematic of an example computer or processing system that may implement a system in an embodiment.

FIG. 6 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems (Redundant Array of Independent Disks), tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for natural language generation, comprising:

receiving a current observation expressed in natural language;

extracting entities in the current observation;

selecting a relevant historical observation from historical observations, the relevant historical observation selected based on the relevant historical observation having at least one of the entities in common with the current observation;

combining the current observation and the relevant historical observation as observations wherein the relevant historical observation includes K most recent observations sorted by time steps, and the combining concatenates the relevant historical observation with the current observation, wherein the relevant historical observation includes a series of passages and corresponding action responses;

obtaining a template list, the template list specifying a list of verb phrases with placeholders for objects;

inputting the observations and the template list to a neural network, the neural network outputting the template list of the verb phrases filled-in with at least some of the entities, at least one verb phrase in the template list including an active verb and representing an action to be taken in a gaming interaction system in context with the observations, the neural network solving a multiple paragraph reading comprehension problem based on the combined current observation and the relevant historical observation in providing the neural network's output; and receiving a reward associated with the neural network's output, wherein based on the reward, the neural network automatically retraining itself.

2. The method of claim 1, wherein the relevant historical observation includes a plurality of relevant historical observations in a time series.

3. The method of claim 1, wherein the neural network takes the verb phrases as queries and computes query-context representation using an attention mechanism in deep learning, wherein an attention between a verb in the verb phrases and an observation word in said at least some of the entities are determined as a sum of an embedding associated with the verb, an embedding associated with the observation word, and an element-wise product of the embedding associated with the verb and the embedding associated with the observation word, wherein the embedding associated with the verb, the embedding associated with the observation word and the element-wise product are parameterized with learnable vectors.

4. The method of claim 1, wherein the entities include noun words identifiable in the observations.

5. The method of claim 1, wherein the current observation includes a current dialog and the historical observations include past dialogs in a conversation carried on in an interactive system.

6. The method of claim 1, wherein the current observation includes a game step in an interactive fiction game and the historical observations include previous games steps in the interactive fiction game.

7. The method of claim 1, wherein the observations and the template list input to a neural network are tokenized using natural language processing, and embedded as vectors using word embeddings.

8. A system for natural language generation, comprising:
a processor; and
a memory coupled to the processor,
the processor configured to:
  receive a current observation expressed in natural language;
  extract entities in the current observation;
  select a relevant historical observation from historical observations, the relevant historical observation selected based on the relevant historical observation having at least one of the entities in common with the current observation;
  combine the current observation and the relevant historical observation as observations, wherein the relevant historical observation includes K most recent observations sorted by time steps, and the combining concatenates the relevant historical observation with the current observation, wherein the relevant historical observation includes a series of passages and corresponding action responses;
  obtain a template list, the template list specifying a list of verb phrases to be filled-in with at least some of the entities;
  input the observations and the template list to a neural network, the neural network outputting the template list of the verb phrases filled-in with said at least some of the entities, at least one verb phrase in the template list including an active verb and representing an action to be taken in a gaming interaction system in context with the observations, the neural network solving a multiple paragraph reading comprehension problem based on the combined current observation and the relevant historical observation in providing the neural network's output; and
  receive a reward associated with the neural network's output, wherein based on the reward, the neural network automatically retraining itself.

9. The system of claim 8, wherein the relevant historical observation includes a plurality of relevant historical observations in a time series.

10. The system of claim 8, wherein the neural network takes the verb phrases as queries and computes query-context representation using an attention mechanism in deep learning.

11. The system of claim 8, wherein the entities include noun words identifiable in the observations.

12. The system of claim 8, wherein the current observation includes a current dialog and the historical observations include past dialogs in a conversation carried on in an interactive system.

13. The system of claim 8, wherein the current observation includes a game step in an interactive fiction game and the historical observations include previous games steps in the interactive fiction game.

14. The system of claim 8, wherein the observations and the template list input to a neural network are tokenized using natural language processing, and embedded as vectors using word embeddings.

15. A computer program product comprising a computer readable storage medium having program instructions embodied therewith, the program instructions readable by a device to cause the device to:
  receive a current observation expressed in natural language;
  extract entities in the current observation;
  select a relevant historical observation from historical observations, the relevant historical observation selected based on the relevant historical observation having at least one of the entities in common with the current observation;
  combine the current observation and the relevant historical observation as observations wherein the relevant historical observation includes K most recent observations sorted by time steps, and the combining concatenates the relevant historical observation with the current observation, wherein the relevant historical observation includes a series of passages and corresponding action responses;
  obtain a template list, the template list specifying a list of verb phrases to be filled-in with at least some of the entities;
  input the observations and the template list to a neural network, the neural network outputting the template list of the verb phrases filled-in with said at least some of the entities, at least one verb phrase in the template list including an active verb and representing an action to be taken in a gaming interaction system in context with the observations, the neural network solving a multiple paragraph reading comprehension problem based on the combined current observation and the relevant historical observation in providing the neural network's output; and
  receive a reward associated with the neural network's output, wherein based on the reward, the neural network automatically retraining itself.

16. The computer program product of claim 15, wherein the relevant historical observation includes a plurality of relevant historical observations in a time series.

17. The computer program product of claim 15, wherein the neural network takes the verb phrases as queries and computes query-context representation using an attention mechanism in deep learning.

18. The computer program product of claim 15, wherein the entities include noun words identifiable in the observations.

19. The computer program product of claim 15, wherein the current observation includes a current dialog and the historical observations include past dialogs in a conversation carried on in an interactive system.

20. The computer program product of claim 15, wherein the current observation includes a game step in an interactive fiction game and the historical observations include previous games steps in the interactive fiction game.

* * * * *